United States Patent [19]

Hellat et al.

[11] Patent Number: 4,695,225
[45] Date of Patent: Sep. 22, 1987

[54] AXIAL SWIRL BODY FOR GENERATING ROTARY FLOWS

[75] Inventors: Jaan Hellat, Rütihof-Baden; Jakob Keller, Killwangen, both of Switzerland

[73] Assignee: BBC Brown, Boveri & Company, Limited, Baden, Switzerland

[21] Appl. No.: 887,977

[22] Filed: Jul. 24, 1986

Related U.S. Application Data

[63] Continuation of Ser. No. 636,499, Aug. 1, 1984, abandoned.

[30] Foreign Application Priority Data

Aug. 30, 1983 [CH] Switzerland ............... 4742/83

[51] Int. Cl.$^4$ .............................................. F01D 9/04
[52] U.S. Cl. ..................................... 415/189; 415/210; 415/217; 415/DIG. 3; 239/486
[58] Field of Search ............... 415/208, 209, 210, 189, 415/DIG. 3, 159, 160, 162, 190, 191, 216, 217, 218; 239/486, 461, 463, 505

[56] References Cited

U.S. PATENT DOCUMENTS

| | | | |
|---|---|---|---|
| 1,055,588 | 3/1913 | Wood | 415/209 |
| 1,931,692 | 10/1933 | Good | 415/189 |
| 2,402,418 | 6/1946 | Kroon | 415/208 |
| 2,524,869 | 10/1950 | Adamtchik | 415/208 |
| 2,658,719 | 11/1953 | Johanson | 415/217 |
| 2,798,661 | 7/1957 | Willenbrock, Jr. et al. | 415/210 |
| 2,812,158 | 11/1957 | Shinn | 415/218 |
| 2,814,433 | 11/1957 | Brinen | 415/210 |
| 2,944,623 | 7/1960 | Bodine, Jr. | 415/209 |
| 3,332,500 | 7/1967 | Bristol et al. | 415/210 |
| 3,708,242 | 1/1973 | Bruneau et al. | 415/217 |
| 3,836,282 | 9/1974 | Mandelbaum | 415/217 |
| 4,643,636 | 2/1987 | Libertini et al. | 415/217 |

FOREIGN PATENT DOCUMENTS

| | | | |
|---|---|---|---|
| 60275 | 12/1969 | Fed. Rep. of Germany | 239/463 |
| 891422 | 3/1944 | France | 415/189 |
| 68609 | 6/1977 | Japan | 415/189 |
| 792369 | 3/1958 | United Kingdom | 415/210 |
| 301494 | 7/1971 | U.S.S.R. | 416/189 |

*Primary Examiner*—Robert E. Garrett
*Assistant Examiner*—John Kwon
*Attorney, Agent, or Firm*—Oblon, Fisher, Spivak, McClelland & Maier

[57] ABSTRACT

Rotary flows are generated in a variety of technical installations.

In these uses, the particular properties of the rotary flows generated and consequently those of the swirl generator itself play an essential part. Thus, for example in burner construction, a swirl is imparted to the combustion air, in order, on the one hand, to accelerate mixing between the fuel and air and, on the other hand, to utilize a possible return flow to improve the ignition condition.

One question, among others relating to the design of the swirl generator, is to decide which flames with which properties are produced by the burner.

It is therefore desirable, for control and optimization of the flame properties, to have available a swirl body of variable swirl intensity and swirl distribution.

For this purpose, the swirl body (1) is equipped with several exchangeable guide blades (4) which are pushed in through a slotted outer tube (2) radially and at a pitch angle ($\theta$). A likewise slotted inner tube (3) performs the function of fixing the guide blades (4) internally.

4 Claims, 6 Drawing Figures

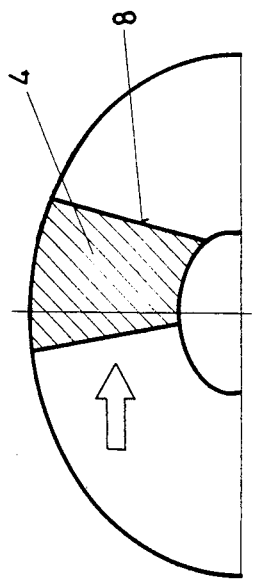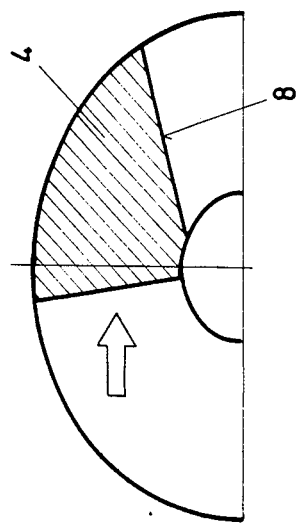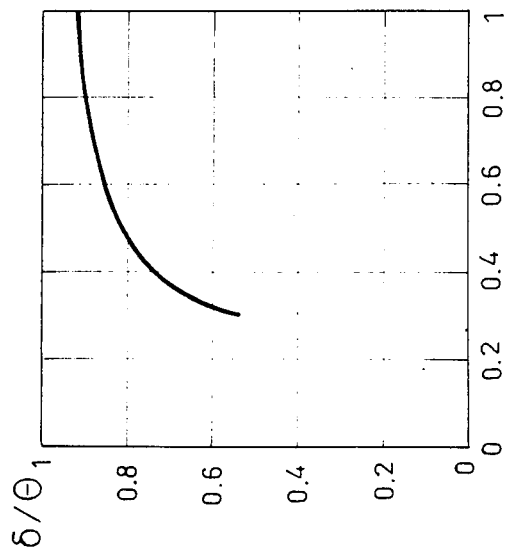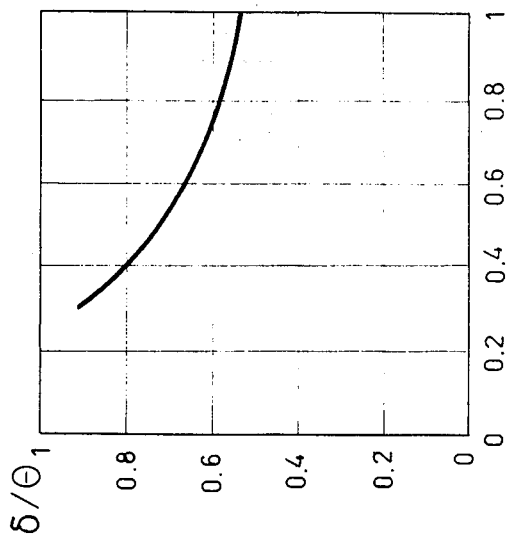
FIG.4
FIG.3

4,695,225

AXIAL SWIRL BODY FOR GENERATING ROTARY FLOWS

This application is a continuation of application Ser. No. 636,499, filed Aug. 1, 1984, now abandoned.

FIELD OF THE INVENTION

The present invention relates to an axial swirl body for generating rotary flows with selectively variable peripheral speeds.

BACKGROUND OF THE INVENTION

Rotary flows are generated in a variety of technical installations, such as, for example, burners, particle separators, etc.

In these uses, the particular properties of the rotary flows generated and consequently those of the swirl generator itself play an essential part. Thus, for example in burner construction, a swirl is imparted to the combustion air, in order, on the one hand, to accelerate mixing between the fuel and air and, on the other hand, to utilize a possible return flow to improve the ignition conditions.

One question, among others relating to the design of the swirl generator, is to decide which flames with which properties are produced by the burner. It is therefore desirable, for control and optimization of the flame properties, to have available a swirl body of variable swirl intensity and swirl distribution.

In principle, swirl can be generated in several ways:
1. By means of a drive via rotating blades.
2. As a result of tangential introduction of the flow medium through a nozzle.
3. By means of guide blades in a radial channel and the result of subsequent deflection of the rotary flow in an axial direction.
4. By means of guide blades arranged axially.

A specific swirl distribution and category of flows are assigned to each of these swirl generators. In all cases, it is expensive in terms of construction to execute variable adjustment of the swirl intensity, which can be achieved by means of a controllable proportion with unswirled medium or by means of adjustable pitch angles of the guide blades. In burner construction, swirl generators with guide blades arranged axially are in widespread use, since a compact and simple design is guaranteed with these. However, precisely in the case of this type of swirl generator, measures for producing different swirl intensities are extremely difficult, with the result that a set of several swirl generators with different pitch angles of the guide blades is generally adopted.

OBJECTION OF THE INVENTION

The invention is intended to remedy the foregoing problem. The object on which the invention is based is, in the case of an axial swirl body of the type mentioned in the introduction, to obtain the desired change in distribution and intensity of the flow swirl simply by the use of guide blades of different sizes. The surface of the guide blades is appropriately made plane.

SUMMARY OF THE INVENTION

The idea of the invention is based on the fact that a plane guide blade installed in an annular tube at a pitch angle has an elliptical contour. At the same time, the flow-off angle at the trailing edge of the guide blade is less than the pitch angle of the blade itself, unless the trailing edge of the blade is located on the minor half-axis of the ellipse. In this case, the angles are defined in relation to the plane perpendicular to the axis. Accordingly, the flow-off angle becomes the smaller, the larger the arc angle between the trailing edge of the blade and the minor half-axis of the ellipse that is to say, the flow is swirled with greater intensity than would correspond to the pitch angle of the guide blade. Thus, with a given pitch angle, it becomes possible to select an effective flow-off angle between the limiting values 0 (purely tangential deflection) and the pitch angle of the guide blade itself.

Furthermore, by means of a suitable choice of the contour of the trailing edge of the guide blade, any radial distribution of the flow-off angle and consequently of the swirl can be achieved.

A further advantage of the invention arises from the possibility that, if required, only the guide blades need be exchanged, instead of the entire swirl body, because the new guide blades can be pushed in through the slotted outer tube. At the same time, an annular sleeve pushed over the slotted outer tube prevents the guide blades from falling out in a radial direction and fixes the blades in the correct position in which the contour of the blade and that of the slot coincide. The guide blades are fixed in a radial direction from inside by means of an inner tube which can likewise be slotted for better stabilization of the swirl body.

A further advantage arises from the following design. In burner construction, it is occasionally necessary, within the swirl body, to constrict the flow from outside by means of a nozzle contraction. For this purpose, in conventional swirl bodies, appropriate parts or guide plates are installed in each blade channel. In contrast to this, here, such a restriction can be made very much more simply by means of a nozzle-shaped rotary part.

BRIEF DESCRIPTION OF THE DRAWINGS

Exemplary embodiments of the subject of the invention are illustrated in simplified form and explained in more detail below with reference to the drawing. No elements which are unimportant for an understanding of the invention are shown.

In the drawings:

FIG. 3 shows the distribution of the flow-off angle at the trailing edge of the guide blade for a radially increasing swirl;

FIG. 4 shows the distribution of the flow-off angle at the trailing edge of the guide blade for a radially decreasing swirl;

DETAILED DESCRIPTION OF THE PRESENTLY PREFERRED EMBODIMENTS

Figure 1:
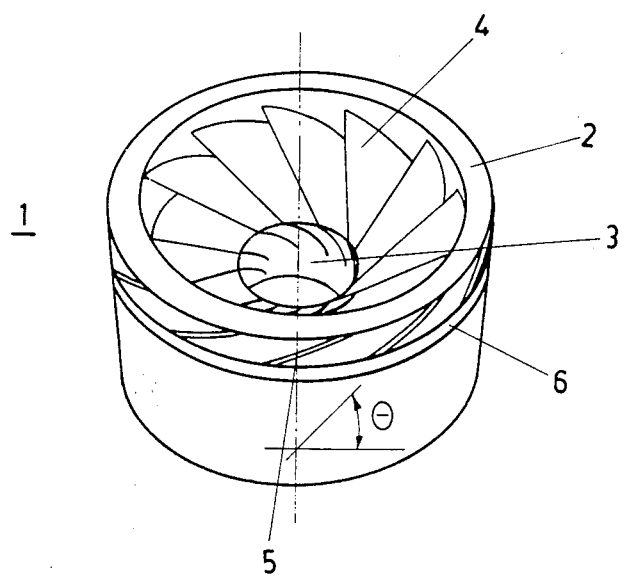
FIG. 1 shows a ready-assembled swirl body.
Figure 2:
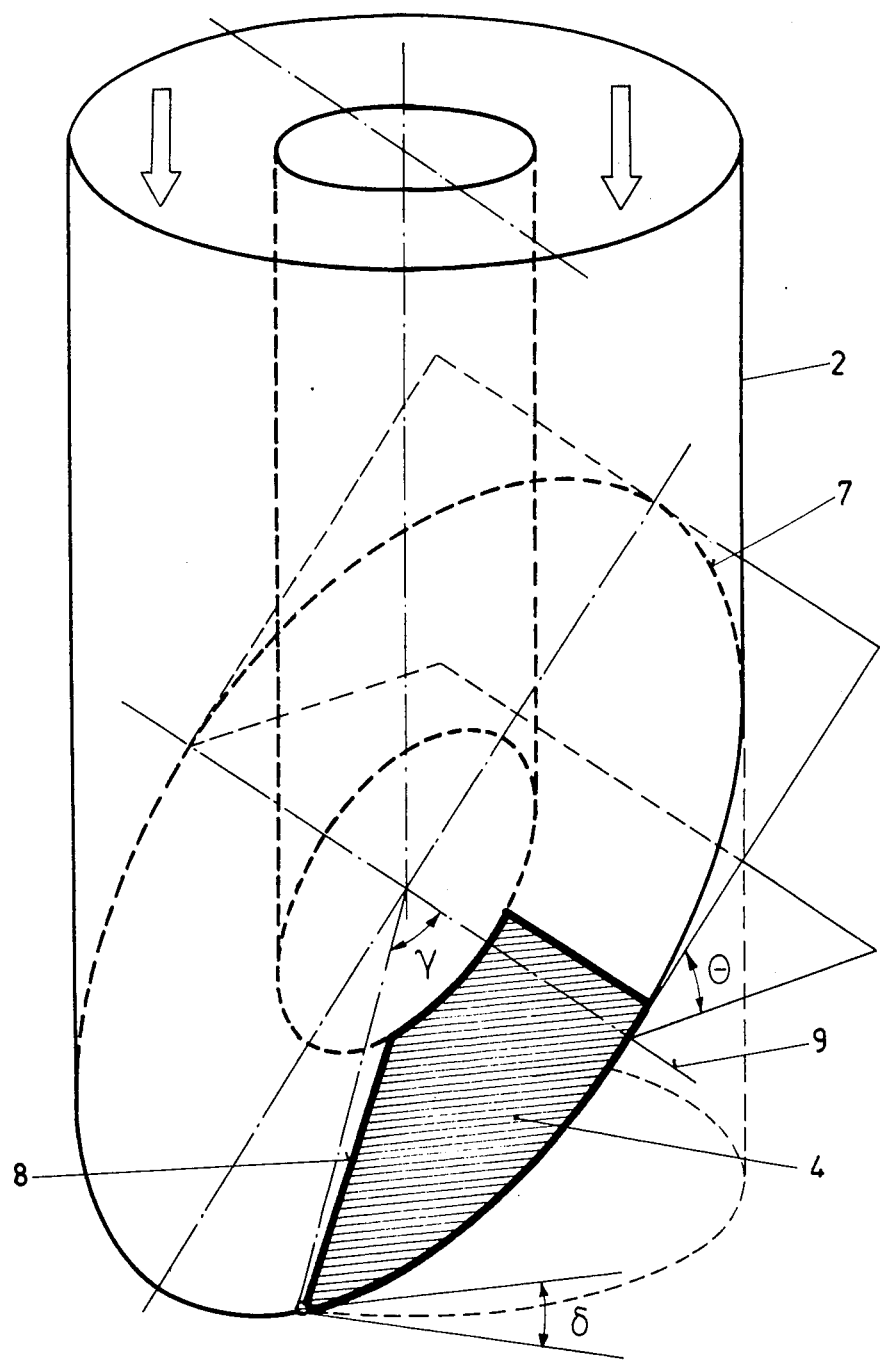
FIG. 2 shows a constructive representation of the elliptical contour and angular relationships of a guide blade installed at a pitch angle in an annular tube.

FIG. 1 shows an assembled axial swirl body 1. An outer tube 2 is provided with plane slots 5 set at an angle $\theta$ relative to a line perpendicular to the axis. Thus, plane guide blades 4, the outer elliptical contour, or slot ellipse, 7 of which corresponds to the outside diameter of the outer tube 2, can be pushed in in a radial direction. An annular sleeve 6 pushed over the slotted outer tube 2 prevents the guide blades 4 from falling out in a radial direction. Furthermore, an inner tube 3, likewise slotted under certain circumstances, must be introduced into the outer tube 2, so that the guide blades 4, with an appropriate elliptical inner contour, can also be fixed in a radial direction from inside. At the same time, the inner tube 3 is centered positively. It is essential that it should be impossible for the plane guide blades 4 to rotate within the plane slots 5 or be displaced in the slot direction, since the guide blades 4 can be fitted only in the position in which their half-axes coincide with the half-axes of the slot ellipses 7 (FIG. 2). It is important that the individual parts of the swirl body be connected to one another positively and in a stable manner. The statements made here as regards plane blades can, of course, apply accordingly to blade surfaces curved in one plane, but it becomes more expensive to produce curved guide blades and, above all, the likewise curved slots.

FIG. 2 indicates the angular relationships and elliptical contour 7 of a guide blade 4 installed at a pitch angle $\theta$ in an annular tube.

The plane guide blade 4 installed in the outer tube 2 at a pitch angle $\theta$ has an elliptical contour 7. When a flow enters the outer tube 2 axially from above and is deflected by the guide blade 4 indicated by hatching, it will be seen that the flow-off angle $\delta$ at the trailing edge 8 of the guide blade 4 must be less than the pitch angle $\theta$ of the guide blade 4, unless the trailing edge 8 of the blade is located on the minor half-axis 9 of the slot ellipse 7. The flow-off angle $\delta$ becomes the smaller, the larger the arc angle $\gamma$ between the trailing edge 8 of the blade 4 and the minor half-axis 9 of the ellipse 7. The following is therefore true:

$$\tan \delta = \tan \theta \cos \{\text{arctg}(\cos \theta \tan \gamma)\},$$

that is to say the flow is swirled with greater intensity than would correspond to the pitch angle $\theta$ of the blade 4.

Consequently, with a given pitch angle $\theta$, it becomes possible to select an effective flow-off angle between the limiting values zero (purely tangential deflection) and $\theta$. As emerges from FIGS. 3 and 4, furthermore, by means of a suitable choice of the contour of the trailing edge 8 of the blade, any radial distribution of the flow-off angle $\gamma$ and consequently of the swirl can be achieved.

The two Figures illustrate the example of two different blade trailing edges 8 for one and the same pitch angle $\theta = 34°$ and the relevant distribution of the flow-off angle $\delta$ at the trailing edge 8 of the blade 4 over the radius of the projection circle r'.

Figure 5:
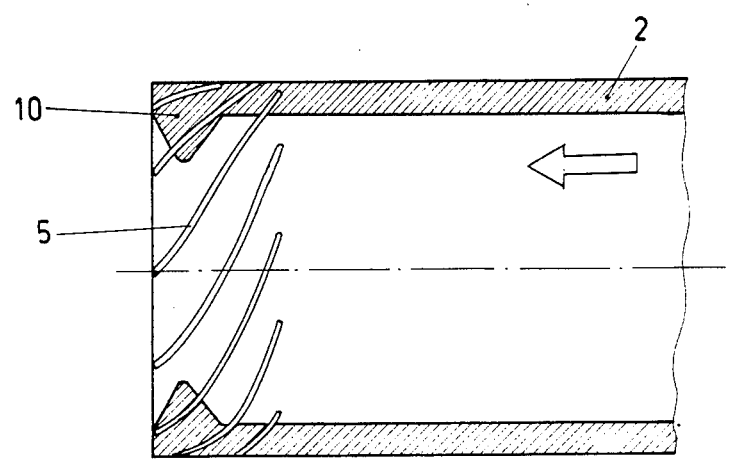
FIG. 5 shows a slotted tube with a nozzle-shaped inner contour.
Figure 6:
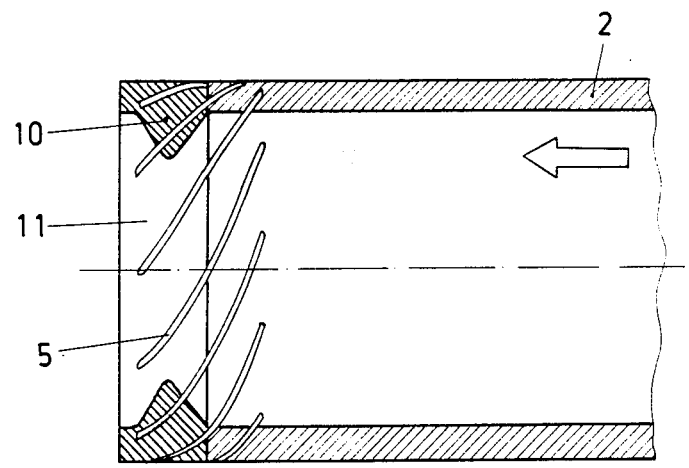
FIG. 6 shows a modification of the arrangement according to FIG. 5.

In burner construction, it is occasionally necessary, within the swirl body 1, to constrict the flow from outside by means of a so-called nozzle contraction 10. As emerges from FIG. 5, such a nozzle contraction 10 can be produced very simply here. Instead of a cylindrical outer tube 2, a tube with a formed nozzle contraction 10 can be slotted at 5. Or, as emerges from FIG. 6, a slotted nozzle part 11 can be added to the cylindrical outer tube 2 with slots 5 up to the tube end.

We claim:

1. An axial swirl body for generating rotary flows having selectively variable peripheral speeds, said axial swirl body comprising:
   (a) an outer tube having a plurality of slots extending therethrough;
   (b) an inner tube coaxially mounted within said outer tube;
   (c) a plurality of exchangeable sets of guide blades, each one of said plurality of exchangeable sets of guide blades comprising a plurality of guide blades, said guide blades and said exchangeable sets of guide blades having the following characteristics:
      (i) said plurality of guide blades in each one of said plurality of exchangeable sets of guide blades are not connected to each other;
      (ii) each one of the plurality of guide blades in each set of guide blades is sized and shaped to pass through a corresponding one of said plurality of slots in said outer tube and to be held in position between said outer tube and said inner tube without deformation;
      (iii) each one of the guide blades in each of said plurality of exchangeable sets of guide blades has the same flow-off angle $\delta$; and
      (iv) each set of guide blades has a different flow-off angle $\delta$; and
   (d) an annular sleeve surrounding said outer tube and axially movable relative thereto, said annular sleeve being sized and shaped so that, during use of the axial swirl body, said annular sleeve prevents unintended radial movement of the set of guide blades held in position between said outer tube and said inner tube,
   whereby:
   (e) the peripheral speed of the rotary flow generated by the axial swirl body can be selectively varied by moving said annular sleeve axially relative to said outer tube to expose said plurality of slots and exchanging one set of guide blades for another set of guide blades and
   (f) the guide blades in each one of said exchangeable sets of guide blades can be reused repeatedly.

2. An axial swirl body as recited in claim 1 wherein the surfaces of the guide blades in each set of guide blades are planar.

3. An axial swirl body as recited in claim 1 wherein a nozzle contraction is formed in said outer tube.

4. An axial swirl body as recited in claim 1 wherein said guide blades have no blade bases, but are of uniform thickness in the radial direction.

* * * * *